US008491844B2

(12) United States Patent
Briglia et al.

(10) Patent No.: US 8,491,844 B2
(45) Date of Patent: Jul. 23, 2013

(54) SCRUBBING A GAS CONTAINING NITROGEN OXIDES

(75) Inventors: Alain Briglia, Corze (FR); Ludovic Granados, Puteaux (FR); Christian Monereau, Paris (FR); Elise Renou, Chaville (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/322,609

(22) PCT Filed: May 18, 2010

(86) PCT No.: PCT/FR2010/050952
§ 371 (c)(1),
(2), (4) Date: Nov. 28, 2011

(87) PCT Pub. No.: WO2010/136698
PCT Pub. Date: Dec. 2, 2010

(65) Prior Publication Data
US 2012/0070354 A1   Mar. 22, 2012

(30) Foreign Application Priority Data
May 29, 2009 (FR) ...................................... 09 53546

(51) Int. Cl.
*B01D 53/74* (2006.01)
*B01D 53/81* (2006.01)

(52) U.S. Cl.
USPC ........... 422/168; 422/169; 422/170; 422/171; 423/235; 423/239.1

(58) Field of Classification Search
USPC ........................ 423/235, 239.1; 422/168–171
See application file for complete search history.

(56) References Cited

U.S. PATENT DOCUMENTS

| | | | | |
|---|---|---|---|---|
| 4,564,510 A | * | 1/1986 | Bechthold et al. | 423/235 |
| 4,783,325 A | * | 11/1988 | Jones | 423/235 |
| 4,824,646 A | | 4/1989 | Haskell | |
| 5,492,676 A | * | 2/1996 | Katatani et al. | 422/168 |
| 6,948,308 B2 | * | 9/2005 | Chandler et al. | 60/274 |
| 2002/0039550 A1 | | 4/2002 | Schafer-Sindlinger et al. | |
| 2005/0047982 A1 | * | 3/2005 | Berriman et al. | 423/235 |

FOREIGN PATENT DOCUMENTS

| | | |
|---|---|---|
| DE | 4216772 | 12/1993 |
| EP | 1147801 | 10/2001 |
| FR | 2282404 | 3/1976 |
| GB | 1509974 | 5/1978 |

OTHER PUBLICATIONS

International Search Report for PCT/FR2010/050952 mailed Dec. 1, 2010.
French Search Report for FR0953546 mailed Dec. 16, 2009.

* cited by examiner

*Primary Examiner* — Timothy Vanoy

(57) ABSTRACT

The invention relates to a method for removing nitrogen monoxide (NO) and nitrogen oxides (NOx with x>1) from a gas stream, implementing a device including a catalytic bed for converting a portion at least a part of the NO into NOx with x>1, and a unit for reducing the NOx with x>1, and in which the gas stream is placed into contact with the catalytic bed before entering the unit for reducing the NOx with x>1.

8 Claims, No Drawings

US 8,491,844 B2

SCRUBBING A GAS CONTAINING NITROGEN OXIDES

CROSS-REFERENCE TO RELATED APPLICATIONS

This application is a §371 of International PCT Application PCT/FR2010/050952, filed May 18, 2010, which claims §119(a) foreign priority to French patent application 0953546, filed May 29, 2009.

BACKGROUND

1. Field of the Invention

The present invention relates to a process for the purification of a gas stream comprising nitrogen monoxide NO and nitrogen oxides NOx by a purification unit with conversion of the nitrogen monoxide over a catalytic bed prior to said purification.

2. Related Art

Nitrogen oxides (NOx) are pollutants generally emitted during the combustion of fossil fuels. NOx compounds in the atmosphere create tropospheric ozone, which is toxic when it is inhaled. Furthermore, NOx compounds contribute to the formation of acid rain, which is harmful to plant and animal life, and property.

During the treatment and purification stages, in particular compression (followed by refrigeration), NOx compounds will generate acidic condensates, in particular: nitric acid, nitrous acid, and the like.

It is thus preferable to employ a process for scrubbing the flue gases which makes it possible to remove a portion of these impurities upstream of other stages of purification of the flue gases.

Stopping the nitrogen oxides can be carried out by using:
- a low pressure washing column, with or without chemical additive, or
- a column for washing with water, preferably under pressure, or
- cryogenic separation, by distilling $CO_2$-rich combustion flue gases comprising nitrogen oxides (NOx), where nitrogen oxides more highly oxidized than NO are separated from the flue gases.

In particular, two types of processes are available for the treatment of NOx compounds: selective noncatalytic reduction (SNCR) and selective catalytic reduction (SCR). Both use ammonia (or a derivative, such as urea) to reduce the nitrogen oxides to molecular nitrogen, the difference between these two processes being the catalyst: it reduces the operating temperature and the consumption of reactant, it increases the capital costs but it also substantially increases the efficiency.

The SNCR process is characterized by:
- high operating temperatures: between 850 and 1050° C. (according to whether or not additives are used and the starting NH/NO ratio);
- a theoretical maximum degree of denitrification of 90% but, in practice, an efficiency of between 40 and 65% is observed;
- a possible increase in the emissions of nitrous oxide, of CO and of ammonia (due to the use of ammonia as reactant).

The SCR process is characterized by:
- the use of ammonia or urea mixed with air. The gas laden with $NH_3$ subsequently passes through a catalyst comprising several beds in a range of temperatures of between 250 and 380° C. The catalysts most often used are metal oxides on a $TiO_2$ or $Al_2O_3$ support.
- a high degree of reduction, often greater than 90%,
- an operating temperature which increases in proportion as the starting amount of $SO_2$ in the gas to be treated increases (between 170° C. and 540° C.),
- fairly high capital costs.

However, in some of the processes of the state of the art are the nitrogen oxides in the form of nitrogen monoxide NO stopped and they can thus, throughout the process, continue their slow conversion into a more oxidized form, causing problems in the downstream process. This is because NOx compounds can result, in a medium highly concentrated in water (indeed even saturated in water), as in the case of a gas produced by combustion, in the generation of strong acids (essentially nitric acid) capable of bringing about major problems of behavior of the materials used (for example corrosion). This is all the more marked when the conditions of the gas (temperature and pressure) are modified, for example when this gas is compressed for the purpose of subsequent use (additional purification by adsorption, for example, and the like).

Starting from here, a problem which is posed is that of providing an improved process for the purification of a gas stream comprising nitrogen monoxide NO and nitrogen oxides NOx with x>1.

SUMMARY OF THE INVENTION

A solution of the invention is a device for removing nitrogen monoxide NO and nitrogen oxides NOx with x>1 from a gas stream comprising:
- a catalytic bed which makes possible the conversion of at least a portion of the NO to NOx with x>1, and
- a unit for abatement of the NOx with x>1, the catalytic bed being situated upstream of the abatement unit and the abatement unit being a cryogenic separation unit.

As the case may be, the device according to the invention can comprise one or other of the following characteristics:
- the catalytic bed makes possible the conversion of at least 60% of the NO to NOx with x>1, preferably of at least 80% and more preferably of at least 90%,
- the catalytic bed is a bed of silica gel;
- the catalytic bed is a bed of active charcoal doped with sulfur;
- the catalytic bed is a bed of alumina doped with sulfur.

Another subject matter of the present invention is a process for removing nitrogen monoxide NO and nitrogen oxides NOx with x>1 from a gas stream employing a device as claimed in one of claims 1 to 5 and in which the gas stream is brought into contact with the catalytic bed so as to convert at least a portion of the NO to NOx with x>1 before entering the unit for abatement of the NOx with x>1.

The degree of conversion of the nitrogen monoxide is between 25 and 100%, preferably between 50 and 100% and more preferably between 80 and 100%.

As the case may be, the process according to the invention can exhibit one or other of the following characteristics:
- the gas stream is a stream of combustion flue gases;
- the conversion of the NO to NOx with x>1 is carried out at a temperature of between 5 and 150° C., preferably of between 5 and 120° C. and more preferably still of between and 50° C. and/or at a pressure of between 1.3 and 100 bar abs;
- the contact time of the gas stream with the catalytic bed is less than 120 seconds, preferably less than 40 seconds.

The term "contact time" is understood to mean the ratio of the volume of the catalytic bed to the flow rate by volume of the gas stream to be purified.

The catalytic bed in combination with the unit for abatement of the NOx compounds makes it possible to stop the nitrogen oxides both in the form of NO and in the form of NOx (x>1).

Specifically, the gas will be purified of its content of nitrogen oxide in proportion as the conversion of NO to NOx (x>1) will have progressed upstream of the unit for abatement of the NOx compounds. And the removal of the NOx compounds from the gas will be more incomplete in proportion as the amount of nitrogen monoxide increases at the inlet of the unit for abatement of the NOx compounds.

In the specific case where the purification of the NOx compounds is carried out by a cryogenic separation unit, the use of a bed of silica gel upstream of the separation under cold conditions exhibits the twofold advantage:
   of strongly converting the NO to NOx (x>1), and
   of adsorbing the moisture from the gas to be treated before the entry into the cryogenic region of the process.

Finally, if the gas stream comprises mercury, the use of a bed of active charcoal doped with sulfur or of a bed of alumina doped with sulfur makes it possible:
   to convert the NO to NOx (x>1), and
   to stop the mercury.

DETAILED DESCRIPTION OF THE INVENTION

The invention will be described more precisely using the following examples.

EXAMPLE 1

A mixture comprising 97% of $CO_2$ and 3% of oxygen, artificially contaminated with 800 ppm of NO and 200 ppm of $NO_2$, is brought into contact with a 150 $cm^3$ catalytic bed composed of particles of silica gel, at a pressure of 30 bar and a temperature of 10° C. and with a flow rate of 35 Sl/min.

The composition of the gas at the outlet of the catalytic bed is measured and the degree of conversion of the NO to $NO_2$ obtained is 90%. Thus, only approximately 80 ppm, i.e. 8% of the total NOx compounds, are still in the form of NO after passing through the catalytic bed.

The starting $NO_2$ and the $NO_2$ formed by oxidation of the NO can be removed from the gas stream by a unit for abatement of the NOx compounds.

In the present case, if a cryogenic separation unit is used downstream, a total degree of abatement of the NO and NOx compounds present in the starting mixture of approximately 95% is observed.

EXAMPLE 2

A mixture comprising 95% of $CO_2$ and 5% of oxygen, artificially contaminated with 1500 ppm of NO, is brought into contact with a 150 $cm^3$ catalytic bed composed of particles of active charcoal doped with sulfur, at a pressure of 5 bar and a temperature of 120° C. and with a flow rate of 15 Sl/min.

The composition of the gas at the outlet of the catalytic bed is measured and the degree of conversion of the NO to $NO_2$ obtained is 66%.

Just as in example 1, the $NO_2$ formed can be removed from the gas stream by a unit for abatement of the NOx compounds.

In the present case, if a cryogenic separation unit is used downstream, a total degree of abatement of the NO and NOx compounds present in the starting mixture of approximately 83% is observed.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A device for removing nitrogen monoxide NO and nitrogen oxides NOx with x>1 from a gas stream comprising:
   a catalytic bed which makes possible the conversion of at least a portion of the NO to NOx with x>1, and
   a unit for abatement of the NOx with x>1,
the catalytic bed being situated upstream of the abatement unit and the abatement unit being a cryogenic separation unit, wherein the catalytic bed is a bed of active charcoal doped with sulfur.

2. The device of claim 1, wherein the catalytic bed makes possible the conversion of at least 60% of the NO to NOx with x>1.

3. The device of claim 2, wherein the catalytic bed makes possible the conversion of at least 80% of the NO to NOx with x>1.

4. The device of claim 3, wherein the catalytic bed makes possible the conversion of at least 90% of the NO to NOx with x>1.

5. A device for removing nitrogen monoxide NO and nitrogen oxides NOx with x>1 from a gas stream comprising:
   a catalytic bed which makes possible the conversion of at least a portion of the NO to NOx with x>1, and
   a unit for abatement of the NOx with x>1,
the catalytic bed being situated upstream of the abatement unit and the abatement unit being a cryogenic separation unit, wherein the catalytic bed is a bed of alumina doped with sulfur.

6. The device of claim 5, wherein the catalytic bed makes possible the conversion of at least 60% of the NO to NOx with x>1.

7. The device of claim 6, wherein the catalytic bed makes possible the conversion of at least 80% of the NO to NOx with x>1.

8. The device of claim 7, wherein the catalytic bed makes possible the conversion of at least 90% of the NO to NOx with x>1.

* * * * *